(12) United States Patent
Ullman (10) Patent No.: US 8,773,862 B1
(45) Date of Patent: Jul. 8, 2014

(54) HIGH-DEFINITION MULTIMEDIA INTERFACE TAP DEVICE

(76) Inventor: Allan Ullman, Boynton Beach, FL (US)

( * ) Notice: Subject to any disclaimer, the term of this patent is extended or adjusted under 35 U.S.C. 154(b) by 214 days.

(21) Appl. No.: 13/555,513

(22) Filed: Jul. 23, 2012

Related U.S. Application Data (60) Provisional application No. 61/510,379, filed on Jul. 21, 2011.

(51) Int. Cl.
*H05K 7/00* (2006.01)

(52) U.S. Cl.
USPC .............................. 361/728; 361/825; 361/826

(58) Field of Classification Search
USPC ......... 361/728–730, 752, 796, 800, 825, 826, 361/622, 644; 439/210, 428, 578, 424
See application file for complete search history.

(56) References Cited

U.S. PATENT DOCUMENTS

| | | | | |
|---|---|---|---|---|
| 4,025,150 A | * | 5/1977 | Nordberg et al. | 439/218 |
| 4,307,435 A | | 12/1981 | Ullman | |
| 4,569,567 A | * | 2/1986 | Zucchini | 439/639 |
| 4,962,447 A | * | 10/1990 | Ullman | 361/814 |
| 6,119,401 A | * | 9/2000 | Lin et al. | 49/361 |
| 7,396,234 B2 | * | 7/2008 | Sun | 439/32 |
| 2010/0246647 A1 | | 9/2010 | Maillard et al. | |

* cited by examiner

*Primary Examiner* — Hung S Bui
(74) *Attorney, Agent, or Firm* — Stoel Rives LLP (57) ABSTRACT

Preferred embodiments of a radio-frequency and electrical power distribution duct are implemented with high-definition multimedia interface HDMI receptacles to deliver high-bandwidth digital signals to multiple signal receivers.

5 Claims, 8 Drawing Sheets

HIGH-DEFINITION MULTIMEDIA INTERFACE TAP DEVICE

RELATED APPLICATION

This application claims benefit of U.S. Patent Application No. 61/510,379, filed Jul. 21, 2011.

TECHNICAL FIELD

The field of this disclosure relates to digital signal delivery systems, and, in particular, to a system for delivering a digital signal to multiple output devices such as television sets (e.g., high-definition television sets).

BACKGROUND INFORMATION

U.S. Pat. Nos. 4,307,435 and 4,962,447 describe radio-frequency and power distribution ducts to deliver signals and power to a plurality of receivers (e.g., television sets). A distribution duct includes longitudinal compartments containing power receptacles and radio-frequency signal receptacles. Specifically, the radio-frequency signal receptacles correspond to coaxial tees. One threaded shank of each coaxial tee extends through a hole in a cover of the distribution duct, and coaxial cables are connected to the two other threaded shanks of the coaxial tees to electrically connect them together to form a signal distribution system. The signal distribution system is connected to a source (e.g., an antenna) that supplies a signal to the system, and receivers are connected to the threaded shanks extending through the holes of the cover to deliver the signal to the receivers. One particularly useful application of these distribution ducts is the retail sale of television sets in which the television sets are connected to a single signal source and placed side-by-side to be viewed by customers.

Digital signal sources (e.g., digital signal broadcasters, digital versatile disc (DVD) players, Blu-ray disc players, digital set-top boxes) and digital receivers (e.g., high-definition television sets) have become increasingly popular over the last several years. Digital signal sources and digital receivers often include high-definition multimedia interface (HDMI) receptacles that facilitate communication of high-bandwidth digital signals representing one or both of high-quality video and high-quality audio. The applicant has recognized a need for a digital signal distribution system for delivering a high-bandwidth digital signal to multiple digital receivers.

DETAILED DESCRIPTION OF PREFERRED EMBODIMENTS

Figure 1:
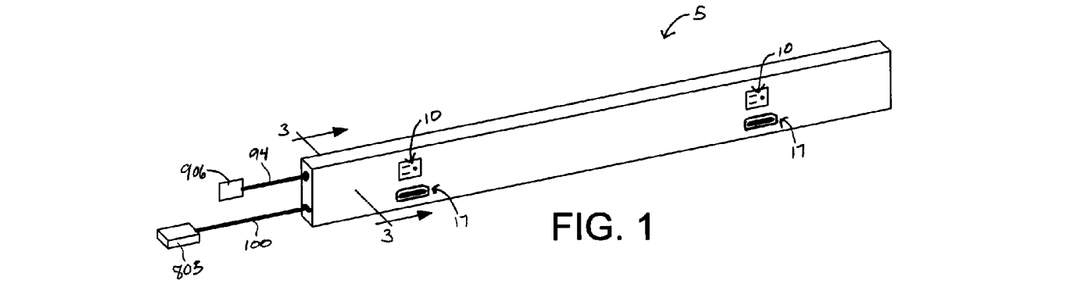
FIG. 1 is an isometric view of a digital signal and power distribution duct according to one embodiment.
Figure 2:
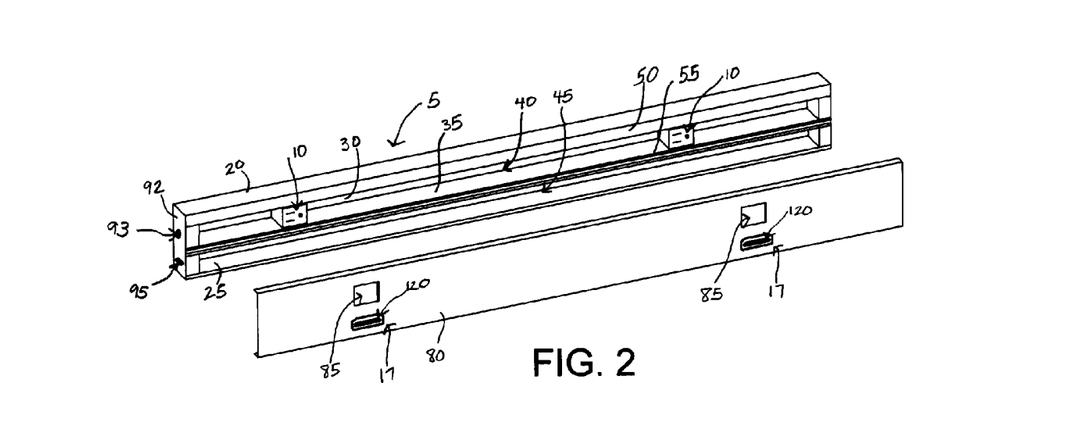
FIG. 2 is a partly exploded isometric view of the digital signal and power distribution duct of FIG. 1.

FIG. 1 is an isometric view and FIG. 2 is a partly exploded isometric view of a digital signal and power distribution duct 5, according to one embodiment, for delivering power and digital signals to multiple digital output devices such as high-definition television sets. Duct 5 includes one or more power receptacles 10 and HDMI tap devices 17 (two power receptacles 10 and two HDMI tap devices 17 are shown in FIGS. 1 and 2) disposed between side walls 20, 25. In one non-limiting example, duct 5 is 8 feet in length and power receptacles 10 and HDMI tap devices 17 are provided every 12 or 16 inches along the length of duct 5. A bottom wall 30 joins side walls 20, 25 to form a generally U-shaped structure. A longitudinal partition 35 depends from bottom wall 30 to divide the U-shaped structure into a longitudinal power compartment 40 and a longitudinal digital signal compartment 45. Inwardly extending flanges 50, 55 extend from respective side walls 20, 25 toward longitudinal partition 35. Inwardly extending flanges 50, 55 support one or more power receptacles 10 as further explained with reference to FIG. 3.

Figure 3:
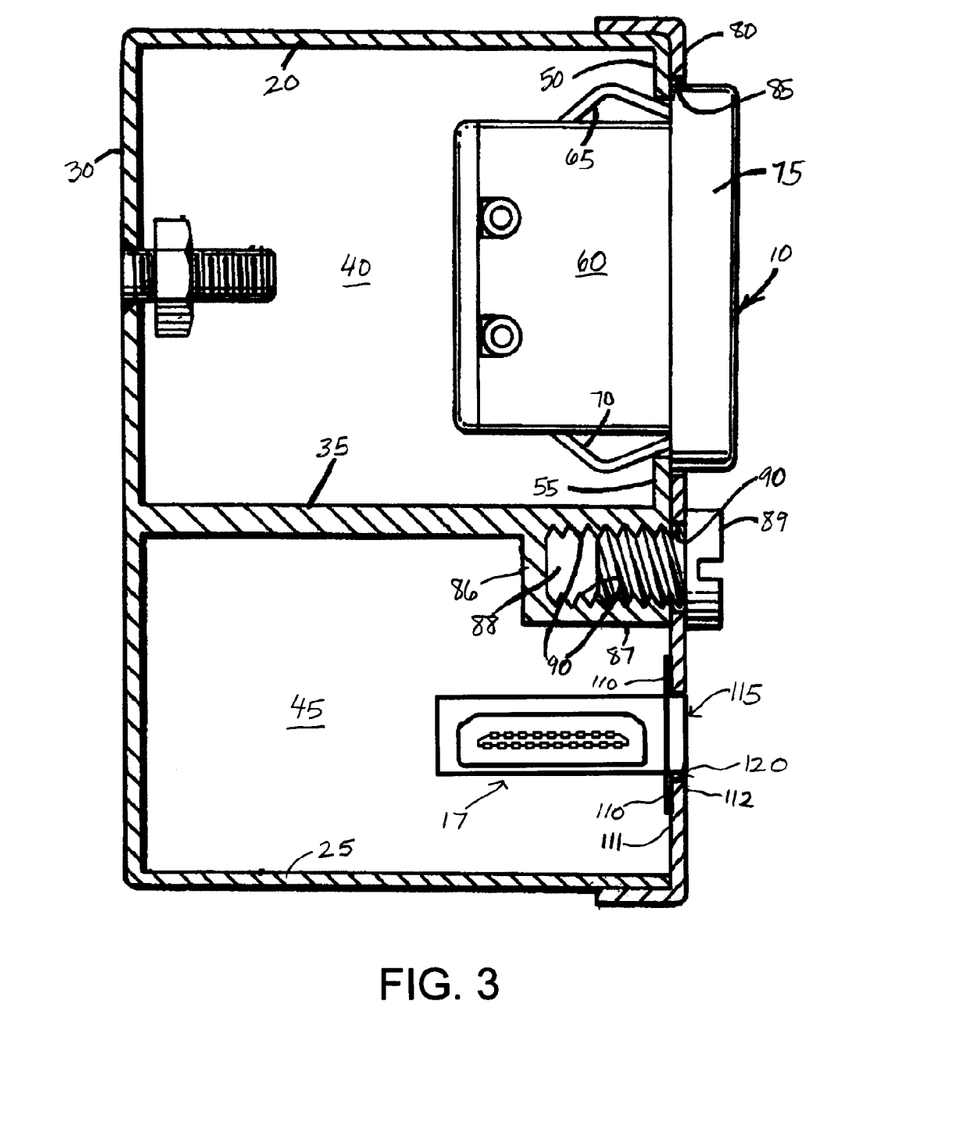
FIG. 3 is an enlarged sectional view of the digital signal and power distribution duct taken along the lines 3-3 of FIG. 1.

FIG. 3 is a cross-sectional end view of duct 5. Each of the power receptacles 10 includes a body portion 60 having a width slightly less than a spacing between flanges 50, 55. Power receptacles 10 also include first and second outwardly extending spring members 65, 70 and an outer face 75 that has a width greater than the width of body portion 60 so that outer face 75 overlies the edges of flanges 50, 55. As power receptacles 10 are inserted into compartment 40, spring members 65, 70 compress to permit outer face 75 to seat against flanges 50, 55, and then spring members 65, 70 expand within compartment 40 to hold outer face 75 against flanges 50, 55.

Duct 5 includes a removable cover 80 that has longitudinally spaced-apart openings 85 that are sized to surround outer face 75 of power receptacles 10. Instead of power receptacles 10 having spring members 65, 70 to hold power receptacles 10 in duct 5, power receptacles 10 may be adhered to cover 80 using an adhesive or secured to it using rivets, screws, nuts and bolts or any other known fastener. Longitudinal partition 35 includes a depending bottom wall 86 and a side wall 87. Walls 86, 87, together with longitudinal partition 35, form a longitudinal channel 88 that has a width that is appropriate to engage a suitable machine screw 89. Optional serrations 90 may be formed in longitudinal partition 35 and wall 87 with a pitch matching that of the threads of screw 89. Cover 80 includes a plurality of openings 90 to accommodate multiple machine screws, such as screw 89. Rivets that engage longitudinal channel 88 may also be used to attach cover 80 to duct 5.

Power receptacles 10 may be placed and moved anywhere along compartment 40. Accordingly, the positions of power receptacles 10 may be adjusted to coincide with the locations of openings 85 in cover 80. Power receptacles 10 are spatially aligned with openings 85 so that power receptacles 10 may be mated with power plugs of external power supply lines connected to output devices to thereby power the output devices. Power receptacles 10 are wired in parallel in a conventional manner prior to installation in compartment 40. Conventional electrical conductors (e.g., power supply lines) for wiring the power receptacles 10 in parallel are not shown. Power receptacles 10 provide AC power connections for output devices. An end wall 92 of duct 5 includes a knock-out opening 93 to accommodate installation of a suitable power connector (e.g., power plug, power receptacle) or a power cord 94 that is hard-wired to one of receptacles 10. Alternatively, knock-out opening 93 for the power connector or power cord 94 may be provided in cover 80. Moreover, power cord 94 may be connected to a resettable fuse (not shown) positioned in power compartment 40, and the resettable fuse may have a reset button that is accessible through an opening in cover 80. End wall 92 also includes a second knock-out opening 95 to accommodate installation of an HDMI connector (e.g., HDMI receptacle connector) or an HDMI signal line 100 (e.g., HDMI cable) that is directly connected to one of HDMI tap devices 17. Alternatively, knock-out opening 95 for the HDMI connector or HDMI signal line 100 may be provided in cover 80.

FIG. 3 shows one of HDMI tap devices 17 provided in longitudinal digital signal compartment 45 and secured to cover 80. HDMI tap devices 17 may be secured to cover 80 using any known securing mechanism and method including spring members similar to spring members 65, 70 of power receptacles 10. In one example, HDMI tap devices 17 includes flanges 110 that facilitate fastening of HDMI tap devices 17 to cover 80. For example, flanges 110 may be adhered to cover 80 using an adhesive or secured to it using rivets, screws, nuts and bolts or any other known fastener. Flanges 110 may be secured to an inner face 111 of cover 80, as shown in FIG. 3, or an outer face 112 of cover 80. Each of HDMI tap devices 17 includes a tap receptacle output face 115 that faces cover 80 and is spatially aligned with one of multiple longitudinally spaced-apart openings 120 in cover 80 to facilitate access to HDMI tap device 17. Tap output receptacle output face 115 may sit flush with outer face 112 of cover 80 as shown in FIG. 3. Alternatively, tap output receptacle output face 115 may extend outward beyond outer face 112 of cover 80 or may be recessed inward from outer face 112.

Figure 4:
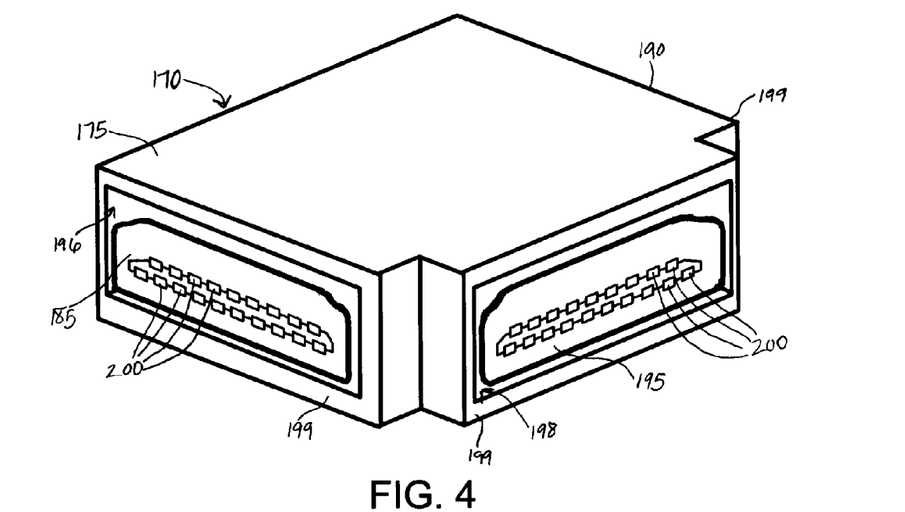
FIG. 4 is an isometric view of an HDMI tap device, according to one embodiment, used in the digital signal and power distribution duct of FIG. 1.
Figure 5:
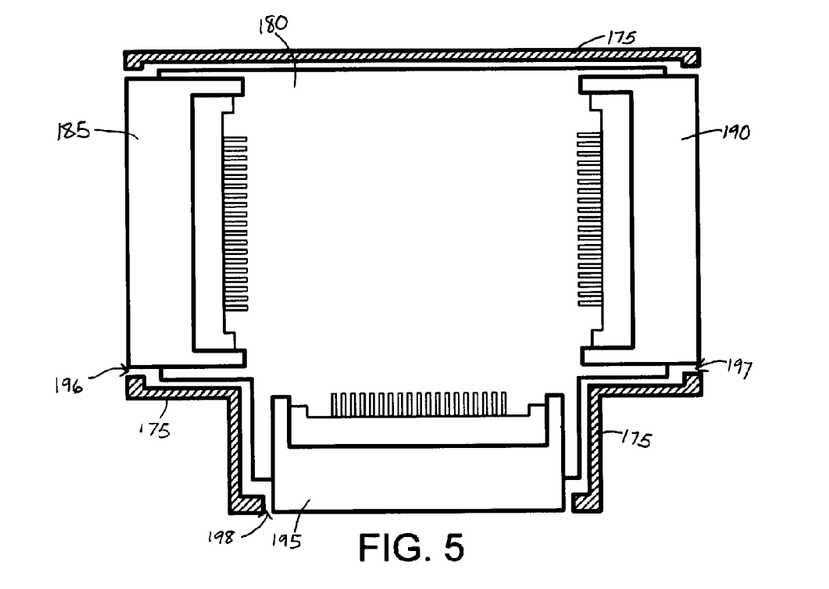
FIG. 5 is a sectional top view of the HDMI tap device of FIG. 4.

HDMI tap devices 17 may be configured in various ways. In general, HDMI tap devices 17 include an input and at least two outputs, one of which is a tap output receptacle (i.e., female) connector configured to receive a plug of a standard HDMI signal line that is located external from compartment 45. FIG. 4 is an isometric view of an HDMI tap device 170, according to one embodiment. HDMI tap device 170 includes a housing 175 that has a "T" shaped profile and contains a printed circuit board (PCB) 180 as shown in FIG. 5. Three HDMI receptacle connectors 185, 190, 195 are mounted on PCB 180 to form an in-line T-tap configuration for HDMI tap device 170. Specifically, connectors 185, 190 face in opposite directions along a common axis (i.e., connectors 185, 190 are in-line), and connector 195 faces in a direction that is transverse to the directions in which connectors 185, 190 face to form a "T" shaped HDMI connector configuration. Connectors 185, 190, 195 are aligned with three openings 196, 197, 198 provided along side walls 199 of housing 175. The in-line T-tap configuration of HDMI tap device 170 enables connector 195 to face and be spatially aligned with one of openings 120 in cover 80 of duct 5 and connectors 185, 190 to face in directions along the longitudinal length of compartment 45 of duct 5 to thereby facilitate ease in connection of receptacle connectors 185, 190 to plug connectors of HDMI cables in compartment 45. In one example, connector 185 is an input receptacle connector, connector 190 is an output receptacle connector, and connector 195 is a tap output receptacle connector.

As shown in FIG. 4, connectors 185, 190, 195 include pins 200 configured in a standard HDMI pin layout (e.g., connector type A layout, connector type B layout, connector type C layout). Pins 200 of connectors 185, 190, 195 are electrically connected to signal traces of PCB 180. Moreover, the signal traces of PCB 180 are configured to electrically connect pins 200 of connector 185 to pins 200 of connectors 190, 195 to form a digital signal tap in which a signal transmitted to connector 185 is further transmitted to connectors 190, 195.

Figure 6:
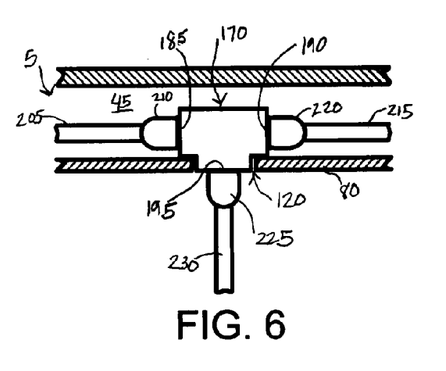
FIG. 6 is a fragmentary sectional top view of the digital signal and power distribution duct of FIG. 1 showing the HDMI tap device of FIG. 4 provided in a compartment of the duct and connected to signal lines.

FIG. 6 is a fragmentary sectional top view of duct 5 showing HDMI tap device 170 provided in compartment 45. An input signal line 205 runs along compartment 45 and includes a plug 210 that mates with connector 185, which serves as an input receptacle connector. An output signal line 215 also runs along compartment 45 and includes a plug 220 that mates with connector 190, which serves as an output receptacle connector. Connector 195, which serves as a tap output receptacle connector, is aligned with one of openings 120 in cover 80 and is mated with a plug 225 of a signal supply line 230 that is external to duct 5. Plugs 210, 220, 225 each include pins that spatially align with and electrically connect to pins 200 of receptacle connectors 185, 190, 195. In the configuration shown in FIG. 6, a digital signal is supplied from input signal line 205 to receptacle connector 185, from receptacle connector 185 to receptacle connector 190, and from receptacle connector 190 to output signal line 215. The digital signal is also supplied from receptacle connector 185 to receptacle connector 195, and from receptacle connector 195 to signal supply line 230.

Figure 7:
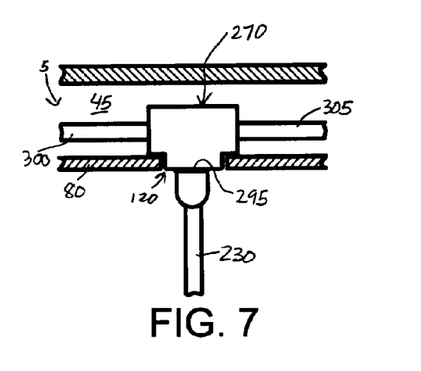
FIGS. 7-11 are fragmentary sectional top views of the digital signal and power distribution duct of FIG. 1 showing alternative HDMI tap device configurations.
Figure 15:
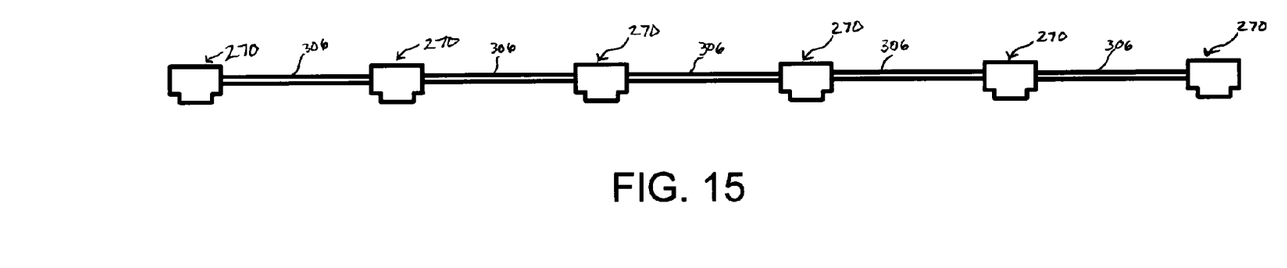
FIG. 15 is a top plan view of multiple HDMI tap devices hard-wired together to form a daisy chain.

Skilled persons will recognize that the configuration of HDMI tap device 170 is one possible configuration for HDMI tap devices 17 and that other configuration are possible. For example, FIGS. 7-11 are partial cross-sectional top plan views of duct 5 showing various other possible configurations for HDMI tap devices 17. Configurations other than those shown in FIGS. 7-11 are possible for HDMI tap device 17. FIG. 7 shows an HDMI T-tap device 270 that has a "T" shaped profile similar to device 170. However, instead of having three receptacle connectors like device 170, device 270 includes one receptacle connector 295 that connects to signal supply line 230. An input signal line 300 and an output signal line 305 are hard-wired to a PCB of device 270, and input signal line 300 is electrically connected to output signal line 305 and receptacle connector 295. Multiple devices 270 may be hard-wired together. For example, FIG. 15 shows six devices 270 hard-wired together via signal lines 306 to form a hard-wired HDMI tap device daisy chain.

Figure 8:
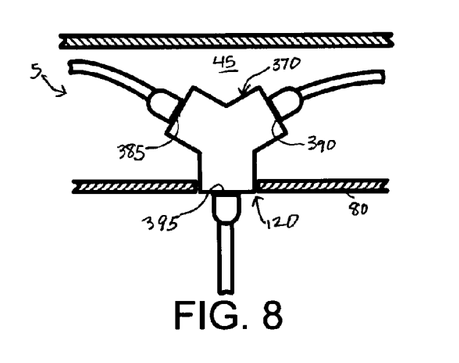

FIG. 8 shows an HDMI Y-tap device 370 that has a "Y" shaped profile. Device 370 includes three receptacle connectors 385, 390, 395 that are the same as connectors 185, 190, 195 of device 170. Alternatively, device 370 may be configured like device 270 in which connectors 385, 390 are replaced with input signal line 300 and output signal line 305 that are hard-wired to a PCB of device 370.

Figure 9:
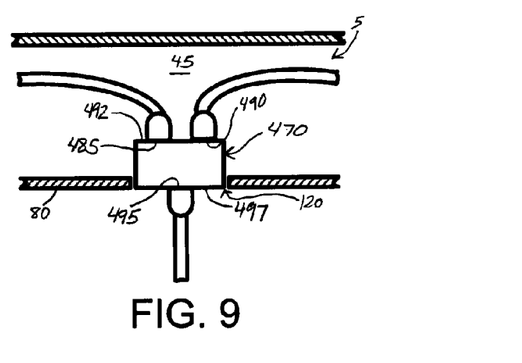

FIG. 9 shows an HDMI tap device 470 that includes an input receptacle connector 485 and an output receptacle connector 490 provided along one side wall 492 of device 470 and a tap output receptacle connector 495 provided along a second side wall 497 opposite side wall 492. Alternatively, device 470 may be configured like device 270 in which connectors 485, 490 are replaced with input signal line 300 and output signal line 305 that are hard-wired to a PCB of device 470.

Figure 10:
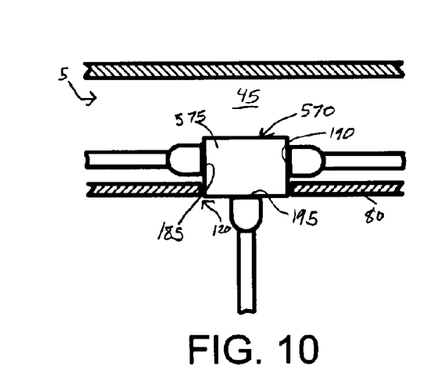

FIG. 10 shows an HDMI T-tap device 570 that is identical to device 170 except that a housing 575 of device 570 has a rectangular shaped profile instead of a "T" shaped profile. Alternatively, device 570 may be configured like device 270 in which connectors 185, 190 are replaced with input signal line 300 and output signal line 305 that are hard-wired to a PCB of device 570.

Figure 11:
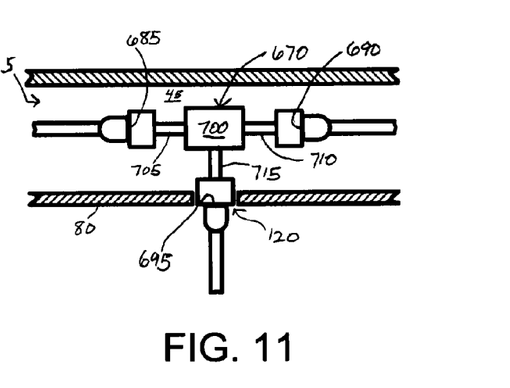

FIG. 11 shows an HDMI T-tap device 670 that includes HDMI receptacle connectors 685, 690, 695 that are electrically connected to a central tap unit 700 via intermediary signal lines 705, 710, 715 that are hard-wired to connectors 685, 690, 695 and a PCB contained in central tap unit 700. Signal lines 705, 710, 715 may be flexible to enable connectors 685, 690, 695 to be maneuvered to various positions.

In some of the configurations of HDMI tap devices 17 in which HDMI tap devices include input and output receptacle connectors, the tap output receptacle connector is positioned to face a different direction from the direction(s) that the input and output receptacle connectors face. Accordingly, the input and output receptacle connectors of HDMI tap devices 17 may be conveniently and easily connected to signal lines contained in compartment 45 of duct 5, while only the tap output receptacle connectors of HDMI tap devices 17 are visible through openings 120 of cover 80. In other configurations of HDMI tap devices 17 in which HDMI tap devices 17 include hardwired input and output signal lines 300, 305, the tap output receptacle connector is positioned to face a different direction than the direction(s) along which input and output signal lines 300, 305 run.

Figures 12, 13:
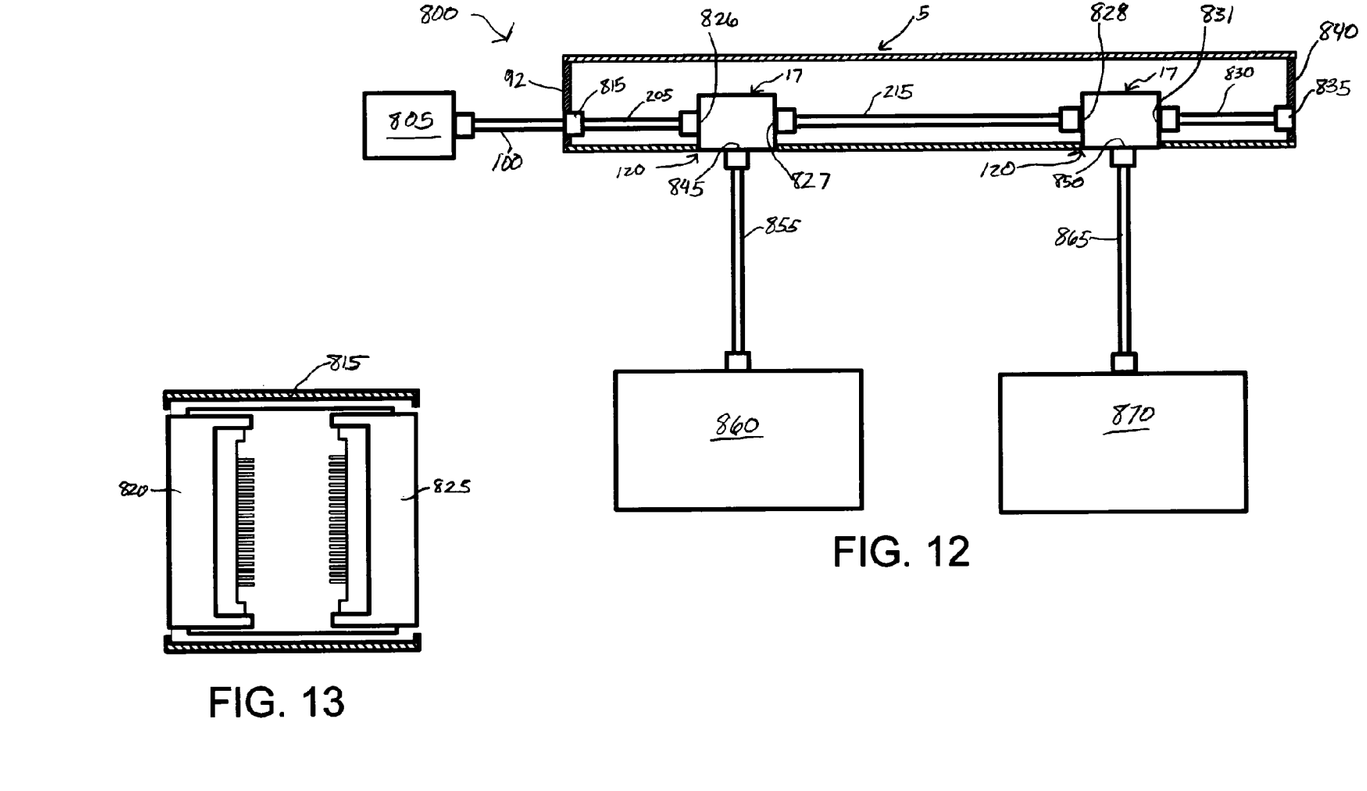
FIG. 12 is a sectional top view of the digital signal and power distribution duct of FIG. 1 shown in relation to a digital signal distribution system that includes two HDMI tap devices in a daisy chain configuration.
FIG. 13 is a sectional top view of an HDMI coupler, according to one embodiment, used in the digital signal distribution system of FIG. 12.

FIG. 12 is a sectional top view of duct 5 shown in relation to a digital signal distribution system 800 that includes two HDMI tap devices 17 and other components. A digital signal source 805 (e.g., a digital signal media source) is connected to HDMI signal line 100. Signal line 100 is connected to an HDMI receptacle connector 815 that is positioned along end wall 92 of duct 5. In one embodiment, HDMI receptacle connector 815 is a receptacle coupler that includes two in-line receptacle connectors 820, 825, as shown in FIG. 13, that are electrically connected to each other. In this embodiment, a plug of signal line 100 is mated with one of receptacles 820, 825, and a plug of input signal line 205 is connected to the other one of receptacles 820, 825. In an alternative embodiment, connector 815 includes one receptacle that is connected to signal line 100, and input signal line 205 is hard-wired to connector 815. Alternatively, signal line 100 may pass through knock-out opening 95 in end wall 92 and be directly connected or hard-wired to a first one of HDMI tap devices 17. In another alternative embodiment, signal line 100 may pass through-knock out opening 95 in end wall 92 and be connected or hard-wired to a signal amplifier (e.g., signal boosting device). In another alternative embodiment, signal line 100 may be a CAT 5, CAT 6, coax, fiber optic, or other type of cable and may connect to an adapter (e.g., an HDMI over CAT 5E/CAT6 receiver, HDMI over coax receiver, HDMI over fiber optic receiver) that configures (e.g., converts) the signal traveling along signal line 100 to an HDMI useable signal.

Input signal line 205 is connected to an input receptacle connector 826 of a first one of HDMI tap devices 17. Output signal line 215 is connected between an output receptacle connector 827 of the first one of HDMI tap devices 17 and an input receptacle connector 828 of a second one of HDMI tap devices 17 to electrically connect HDMI tap devices 17 together. Optionally, a signal line 830 may be connected between an output receptacle connector 831 of the second one of HDMI tap devices 17 and an HDMI receptacle connector 835 provided along a second end wall 840 of duct 5. HDMI receptacle connector 835 may be a receptacle coupler as shown in FIG. 13 or may be hard-wired to signal line 830 and include one receptacle that faces outward from second end wall 840. In an alternative embodiment, second end wall 840 does not include HDMI receptacle connector 835 and signal line 830 passes through a knock-out opening provided in second end wall 840.

Tap output receptacle connectors 845, 850 of HDMI tap devices 17 are aligned with and face one of openings 120 of cover 80. A signal supply line 855 is connected between tap output receptacle connector 845 and a digital output device 860, and a signal supply line 865 is connected between tap output receptacle connector 850 and a digital output device 870.

In operation, digital signal source 805 transmits a digital signal to the first one of HDMI tap devices 17 through signal line 100, connector 815 and input signal line 205. The first one of HDMI tap devices 17 supplies the digital signal to the second one of HDMI tap devices 17 through output signal line 215 and to output device 860 through supply line 855. The second one of HDMI tap devices 17 supplies the digital signal to output device 870. In this manner, both of output devices 860, 870 produce a representation of the digital signal (e.g., display images represented in the digital signal).

Figure 14:
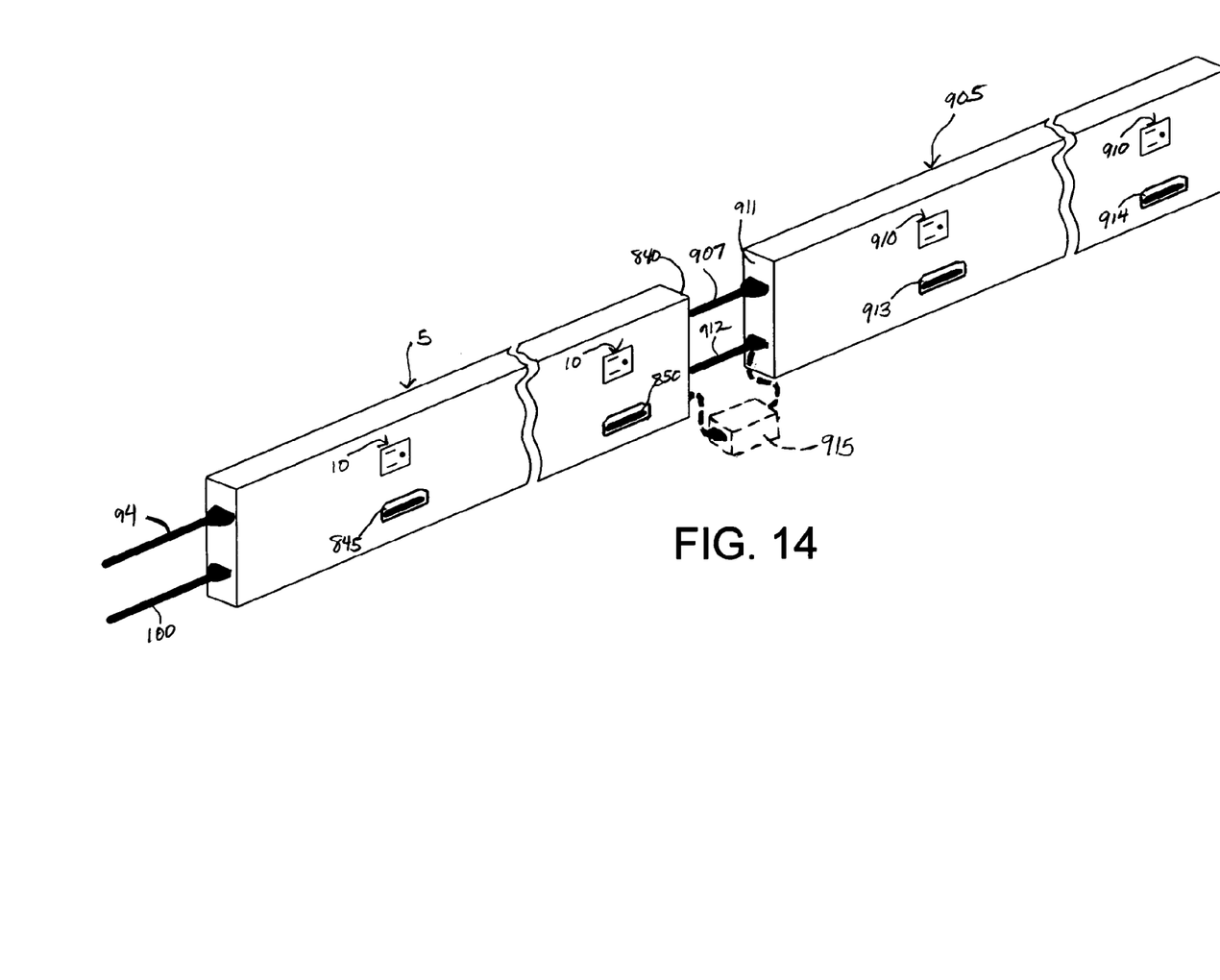
FIG. 14 is an isometric view of two of the digital signal and power distribution ducts of FIG. 1 daisy chained together.

Duct 5 may be connected to other digital signal and power distribution ducts to increase the number of output devices connected to digital signal distribution system 800. FIG. 14 shows one embodiment in which duct 5 is electrically connected to a second duct 905. Power receptacles 10 of duct 5 receive electrical power from an external power source 906, shown in FIG. 1, via power cord 94. A power cord 907 is connected between duct 5 and duct 905 to deliver power to power receptacles 910 of duct 905. Power cord 907 may pass thorough knock-out openings in end walls 840, 911 of ducts 5, 905 and be hard-wired to power receptacles 10, 910, or end walls 840, 911 may include power connectors (e.g., power receptacles, power plugs) to which power cord 907 connects to enable easy connection and disconnection of power between ducts 5, 905. External power supply lines connected to output devices are electrically connected to power receptacles 10, 910 to thereby deliver power to the output devices.

Tap output receptacle connectors 845, 850 of duct 5 receive digital signals from digital signal source 805 via signal line 100. A signal line 912 is connected between duct 5 and duct 905 to deliver the digital signals to tap output receptacle connectors 913, 914 of duct 905. As described above, end wall 840 may include connector 835 to which signal line 912 connects. Alternatively, signal line 912 may pass through a knock-out opening in end wall 840 and be connected or hard-wired to the HDMI tap device that includes receptacle connector 850. End wall 911 of duct 905 may include an HDMI receptacle connector (e.g., a receptacle coupler as shown in FIG. 13) to which signal line 912 connects or a knock-out opening through which signal line 912 passes through to connect to the HDMI tap device that includes tap output receptacle connector 913.

Figure 16:
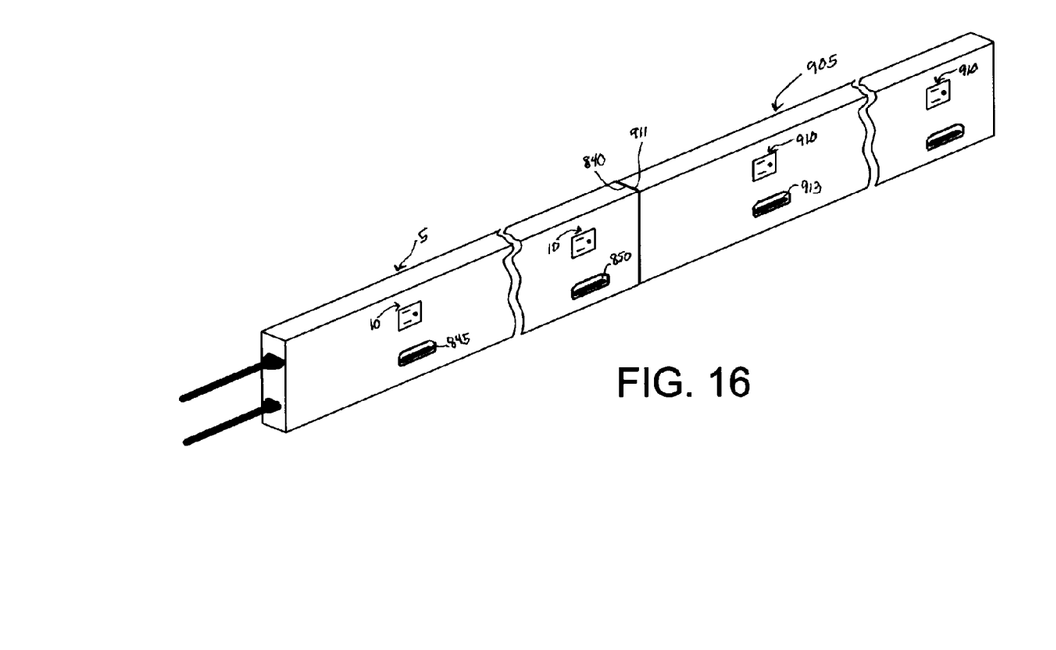
FIG. 16 is an isometric view of two digital signal and power distribution ducts of FIG. 1 that abut each other and are connected together.

In an alternative embodiment shown in FIG. 16, ducts 5, 905 may abut each other instead of having power cord 907 and signal line 912 provided between them. In this embodiment, power receptacles 10, 910 may be hard-wired together and HDMI tap devices including tap output receptacle connectors 850, 913 may be hard-wired together. Alternatively, ducts 5, 905 may include matable (plug and receptacle) power connectors and matable (plug and receptacle) HDMI connectors provided along end walls 840, 911, and the matable power and HDMI connectors electrically connect together when ducts 5, 905 abut each other.

Skilled persons will recognize that one or more other digital signal and power distribution ducts may be connected (e.g., daisy chained) to ducts 5, 905. In one embodiment, a signal boosting device 915 (e.g., an HDMI signal extender, a repeater), as shown in FIG. 14, may be connected in series between ducts 5, 905 to boost the digital signal supplied to the HDMI tap devices of duct 905. Signal boosting device 915 enables the digital signal to maintain an acceptable signal level over a longer distance than a system without signal boosting device 915. Accordingly, signal boosting device 915 may be used to increase the number of ducts daisy chained to duct 5. In one embodiment, one or both of ducts 5, 905 have an integrated signal boosting device provided in digital signal compartment 45 to boost the digital signal. An integrated signal boosting device may be used in the configuration shown in FIG. 16, for example. In another embodiment, one or more of the signal lines (e.g., signal lines 100, 205, 215, 830, 855, 865, 912) that supply the digital signal are active cables that include signal-enhancement electronics embedded in the housing of the signal lines that boost the digital signal.

The digital signal may be supplied over various types of cables that enable the digital signal to be transmitted a longer distance than the distance provided by a typical HDMI cable. For example, a CAT 5, CAT 6, coax, fiber optic, or other cable system may be used to transmit the signal to one or more HDMI tap devices 17. For example, a transmitter (e.g., an extender) may be connected between an HDMI signal source and a CAT 5, CAT 6, coax, fiber optic, or other type of cable that enables an HDMI signal to be transmitted over the cable. A receiver is connected between the CAT 5, CAT 6, coax, fiber optic, or other type of cable and one or more HDMI tap devices 17 to condition the signal traveling along the cable for reception by HDMI tap devices 17. The transmitter and receiver may incorporate boosters and equalization electronics to improve the quality of the digital signal. One or more of the transmitter and receiver may be incorporated in ducts 5, 905 (e.g., provided in or on the housing of ducts 5, 905) or may be stand-alone units.

Figure 17A:
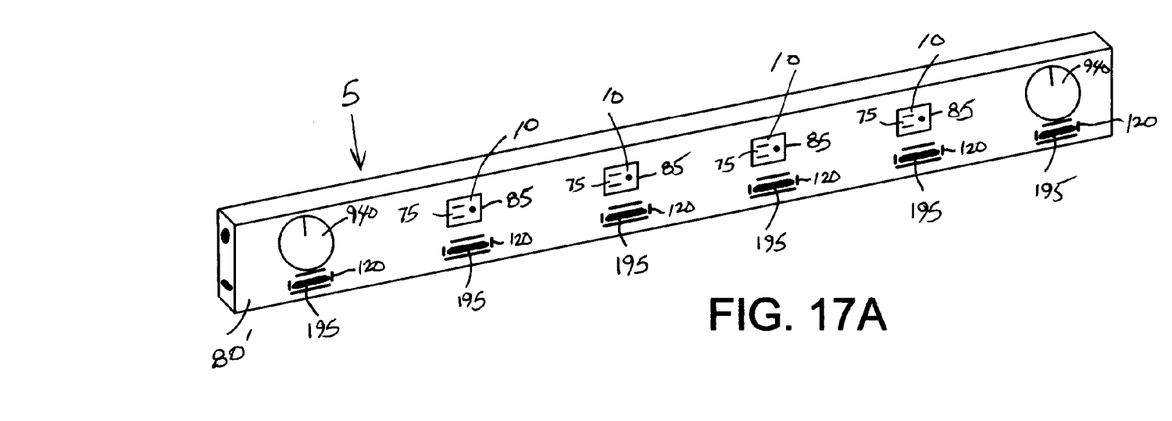
FIG. 17A is an isometric view showing the cover of a distribution duct that holds four power receptacles and six HDMI tap devices.

FIG. 17A shows a cover 80' for the U-shaped structure of distribution duct 5. Cover 80' has along its length (preferably about 4 ft. (1.22 m)) six spaced-apart square openings 85 and four spaced-apart rectangular openings 120. Each square opening 85 is sized to surround outer face 75 of a power receptacle 10 placed in power compartment 40 (FIG. 2). Each rectangular opening 120 receives tap output receptacle connector 195 of an HDMI tap device 170 placed in digital compartment 45 (FIG. 2). Gain control knobs 940 are each connected to a signal boosting device 915 (FIG. 14) installed in digital signal compartment 45 to provide for adjustable digital signal strength.

Figure 17B:
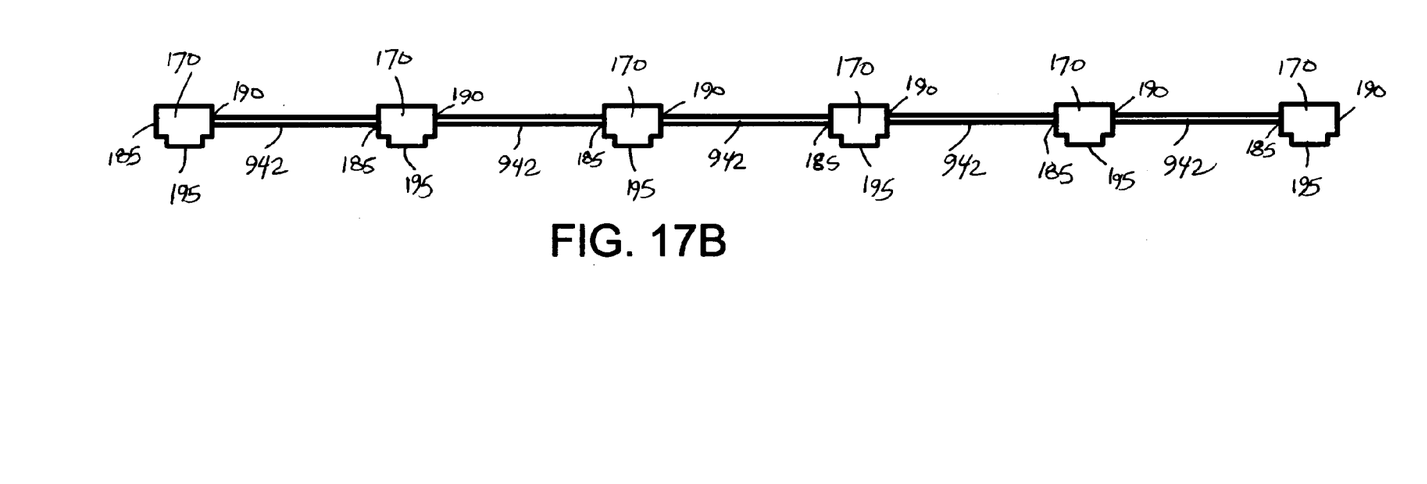
FIG. 17B is a diagram showing use of an extension printed circuit board to provide cableless electrical series interconnection of the six HDMI tap devices of FIG. 17A.

FIG. 17B shows an embodiment in which HDMI output and input receptacle connectors 190, 185 of next adjacent HDMI tap devices 170 are interconnected in electrical series by an extension printed circuit board (PCB) 942, thereby eliminating cable interconnections. Each extension PCB 942 has signal traces that, at their ends, terminate in HDMI receptacle connectors that are matable to their associated HDMI tap device connectors. Corresponding pins 200 (FIG. 4) configured in standard HDMI layout of HDMI receptacle connectors 185, 190 are electrically connected by associated signal traces of extension PCB 942. FIG. 17B shows that each left-side HDMI receptacle connector of PCB 942 is mated with an output receptacle connector 190 and each right-side HDMI receptacle connector of PCB 942 is mated with an input receptacle connector 185. Input receptacle connector 185 of the left-most HDMI tap device 170 and output receptacle connector 190 of the right-most HDMI tap device 170 can be connected by coaxial cables to, respectively, receive input and deliver output digital signals.

It will be obvious to skilled persons that many changes may be made to the details of the above-described embodiments without departing from the underlying principles of the invention. The scope of the invention should, therefore, be determined only by the following claims.

The invention claimed is:

1. A high-definition multimedia interface tap device for use in a digital signal distribution duct configured to supply a digital signal to multiple output devices, the distribution duct including a cover having multiple longitudinally spaced-apart openings, comprising:
   a housing containing a circuit board and including multiple openings;
   an input receptacle connector connected to the circuit board and including electrically conductive pins, the input receptacle connector spatially aligned with a first one of the openings of the housing to allow the pins of the input receptacle connector to electrically connect to corresponding pins of a plug connector of an input signal line contained in the distribution duct so that a digital signal traveling along the input signal line is transmitted to the tap device;
   an output receptacle connector connected to the circuit board and including electrically conductive pins, the output receptacle connector spatially aligned with a second one of the openings of the housing to allow the pins of the output receptacle connector to electrically connect to corresponding pins of a plug connector of an output signal line contained in the digital distribution duct, ones of the pins of the output receptacle connector being electrically connected to ones of the pins of the input receptacle connector to enable the digital signal to be transmitted from the input receptacle connector to the output receptacle connector; and
   a tap output receptacle connector connected to the circuit board and including electrically conductive pins, the tap output receptacle connector spatially aligned with a third one of the openings of the housing to allow the pins of the tap output receptacle connector to electrically connect to corresponding pins of a plug connector of an external signal supply line that is electrically connected to one of the output devices, ones of the pins of the tap output receptacle connector being electrically connected to ones of the pins of the input receptacle connector to enable the digital signal to be transmitted from the input receptacle connector to the tap output receptacle connector, the input, output and tap output receptacle connectors being positioned relative to one another such that when the tap device is positioned inside the distribution duct and the input and output receptacle connectors are mated with the plugs of the input and output signal lines contained in the distribution duct, the tap output receptacle connector is spatially aligned with and faces one of the openings of the cover of the distribution duct to enable the plug connector of the signal supply line to be mated with the tap output receptacle connector.

2. The tap device of claim 1, in which the input receptacle connector and the output receptacle connector are in-line and face in opposite directions and the tap output receptacle connector is provided between the input and output receptacle connectors and faces in a direction transverse to the directions that the input and output receptacle connectors face to thereby provide a T-shape for the tap device.

3. A power and digital signal distribution duct configured to supply power and a digital signal to multiple output devices, comprising:
   a U-shaped duct housing that includes first and second longitudinal compartments;
   a cover attached to the duct housing, the cover including a first set of longitudinally spaced-apart openings that are arranged to be aligned with and run along the first longitudinal compartment and a second set of longitudinally spaced-apart openings that are arranged to be aligned with and run along the second longitudinal compartment;
   a power line provided in the first longitudinal compartment, the power line being electrically connected to an external power source;
   a power receptacle provided in the first longitudinal compartment and electrically connected to the power line, the power receptacle being spatially aligned with an opening of the first set of longitudinally spaced-apart openings to enable the power receptacle to mate with a power plug of an external power supply line connected to one of the output devices;
   an input signal line provided in the second longitudinal compartment, the input signal line being electrically connected to an external digital signal source and including a plug connector having electrically conductive pins, the digital signal source configured to transmit a digital signal to the input signal line;
   an output signal line provided in the second longitudinal compartment and including a plug connector having electrically conductive pins;
   a high-definition multimedia interface tap device provided in the second longitudinal compartment and including:
      an input receptacle connector mated with the input signal line, the input receptacle connector including electrically conductive pins that are electrically connected to the pins of the plug connector of the input signal line to enable transmission of the digital signal from the input signal line to the tap device;
      an output receptacle connector mated with the output signal line, the output receptacle connector including electrically conductive pins that are electrically connected to the pins of the plug connector of the output signal line, ones of the pins of the output receptacle connector being electrically connected to ones of the pins of the input receptacle connector to enable the digital signal to be transmitted from the input receptacle connector to the output receptacle connector and the output signal line; and
      a tap output receptacle connector including pins that are electrically connected to ones of the pins of the input receptacle connector to enable the digital signal to be transmitted from the input receptacle connector to the tap output receptacle connector, the input, output, and tap output receptacle connectors being positioned relative to one another such that the input and output receptacle connectors face in longitudinal directions along the second longitudinal compartment of the duct housing and the tap output receptacle connector faces the cover and is aligned with one of the openings of the second set of longitudinally spaced-apart openings to thereby enable the tap output receptacle connector to be mated with a plug connector of an external signal supply line electrically connected to one of the output devices so that the digital signal is transmitted to the signal supply line and the output device.

4. The power and digital signal distribution duct of claim 3, further comprising a signal boosting device provided in the second longitudinal compartment and electrically connected to the input signal line, the signal boosting device operable to increase a signal level of the digital signal supplied to the tap device.

5. A high-definition multimedia interface system configured to supply a digital signal to multiple output devices, comprising:
   multiple high-definition multimedia interface tap devices each including a tap output receptacle connector that has electrically conductive pins that are configured to connect to corresponding pins of a plug connector of a signal supply line connected to one of the output devices; and
   multiple signal lines hard-wired to the high-definition multimedia interface tap devices to form a daisy chain in which the high-definition multimedia interface tap devices are electrically connected together to facilitate communication of the digital signal between the high-definition multimedia interface tap devices, each signal line serving as an output signal line for one of the multiple high-definition multimedia interface tap devices and as an input signal line for another one of the high-definition multimedia interface tap devices, and the high-definition multimedia interface tap devices including electrical connections between the signal lines and the tap output receptacle connectors to thereby facilitate communication of the digital signal to the output devices when the signal supply lines connected to the output devices are connected to the tap output receptacle connectors.

* * * * *